US008166467B2

(12) United States Patent
Biswas et al.

(10) Patent No.: US 8,166,467 B2
(45) Date of Patent: Apr. 24, 2012

(54) AUTOMATIC IDENTIFICATION OF APPLICATION-SPECIFIC FUNCTIONAL UNITS WITH ARCHITECTURALLY VISIBLE STORAGE

(75) Inventors: Partha Biswas, Natick, MA (US); Laura Pozzi, Lugano (CH); Nikil Dutt, Irvine, CA (US); Paolo Ienne, Lausanne (CH)

(73) Assignee: Ecole Polytechnique Federale De Lausanne, Lausanne (CH)

( * ) Notice: Subject to any disclaimer, the term of this patent is extended or adjusted under 35 U.S.C. 154(b) by 1505 days.

(21) Appl. No.: 11/651,988

(22) Filed: Jan. 11, 2007

(65) Prior Publication Data

US 2007/0162900 A1 Jul. 12, 2007

Related U.S. Application Data

(60) Provisional application No. 60/757,906, filed on Jan. 11, 2006.

(51) Int. Cl.
*G06F 9/45* (2006.01)
(52) U.S. Cl. .......................... 717/156; 717/151; 717/155
(58) Field of Classification Search ........................ None
See application file for complete search history.

(56) References Cited

OTHER PUBLICATIONS

K. Atasu, L. Pozzi and P. Ienne, "Automatic Application-Specific Instruction-Set Extensions under Microarchitectural Constraints", In *Proc. of DAC*, 2003.
L. Pozzi, K. Atasu, and P. Ienne, "Exact and Approximate Algorithms for the Extension of Embedded Processor Instruction Sets", *IEEE TCAD*, vol. 25, No. 7, (Jul. 2006).

J. Cong, Y. Fan, G. Han, and Z. Zhang, "Application-specific instruction generation for configurable processor architectures", In *Proc. of FPGA*, 2004.
P. Biswas, V. Choudhary, K. Atasu, L. Pozzi, P. Ienne and N. Dutt "Introduction of Local Memory Elements in Instruction Set Extensions", In *Proc. of DAC*, 2004.
P. Biswas, S. Banerjee, N. Dutt, L. Pozzi and P. Ienne. "ISEGEN: Generation of High-Quality Instruction Set Extensions by Iterative Improvement", In *Proc. of DATE*, 2005.
N. Clark, H. Zhong and S. Mahlke, "Processor Acceleration through Automated Instruction Set Customization", In *Proc. of MICRO*, 2003.
F. Sun, S. Ravi, A. Raghunathan and N. K. Jha, "Synthesis of Custom Processors based on Extensible Platforms", In *Proc. of ICCAD*, 2002.
T. Callahan and J. Wawrzynek, "Adapting Software Pipelining for Reconfigurable Computing", In *Proc. of CASES*, 2000.
A. Wang, E. Killian, D. Maydan and C. Rowen, "Hardware/Software Instruction Set Configurability for System-on-Chip Processors", In *Proc. of DAC*, 2001.

(Continued)

*Primary Examiner* — Lewis A Bullock, Jr.
*Assistant Examiner* — Mark Gooray
(74) *Attorney, Agent, or Firm* — Harness, Dickey & Pierce, P.L.C.

(57) ABSTRACT

Instruction Set Extensions (ISEs) can be used effectively to accelerate the performance of embedded processors. The critical, and difficult task of ISE selection is often performed manually by designers. A few automatic methods for ISE generation have shown good capabilities, but are still limited in the handling of memory accesses, and so they fail to directly address the memory wall problem.
We present here the first ISE identification technique that can automatically identify state-holding Application-specific Functional Units (AFUs) comprehensively, thus being able to eliminate a large portion of memory traffic from cache and main memory. Our cycle-accurate results obtained by the SimpleScalar simulator show that the identified AFUs with architecturally visible storage gain significantly more than previous techniques, and achieve an average speedup of 2.8× over pure software execution. Moreover, the number of required memory-access instructions is reduced by two thirds on average, suggesting corresponding benefits on energy consumption.

16 Claims, 4 Drawing Sheets

OTHER PUBLICATIONS

R. Razdan and M. D. Smith, "A High-performance Microarchitecture with Hardware-programmable Functional Units", In *Proc. of MICRO*, 1994.

Z. A. Ye, A. Moshovos, S. Hauck and P. Banerjee, 'CHIMAERA: A High-performance Architecture with a Tightly-Coupled Reconfigurable Functional Unit, In *Proc. of ISCA*, 2000.

S. Steinke, L. Wehmeyer, B.S. Lee and P. Marwedel, "Assigning Program and Data Objects to Scratchpad for Energy Reduction", In *Proc. of DATE*, 2002.

L. Benini, A. Macii, E. Macii, M. Poncino "Synthesis of Application-Specific Memories for Power Optimization in Embedded Systems", In *Proc. of DAC*, 2000.

R. Schreiber, S. Aditya, S. Mahlke, V. Kathail et al., "PICO-NPA: High-Level Synthesis of Nonprogrammable Hardware Accelerators", *Journal of VLSI Signal Processing Systems archive*, vol. 31, Issue 2, pp. 127-142, 2002.

K. D. Cooper and J. Lu, "Register Promotion in C Programs", In *Proc. of PLDI*, 1997.

D. M. Gallagher, "Memory Disambiguation to Facilitate Instruction-Level Parallelism Compilation", *PhD Thesis, University of Illinois, Urbana-Champaign*, 1995.

S. S. Muchnick. Advanced Compiler Design and Implementation. *Morgan Kaufmann Publishers*, 1997.

D. Burger and T. Austin, "The SimpleScalar Tool Set, Version 2.0", *Computer Architecture News*, pp. 13-25, 1997.

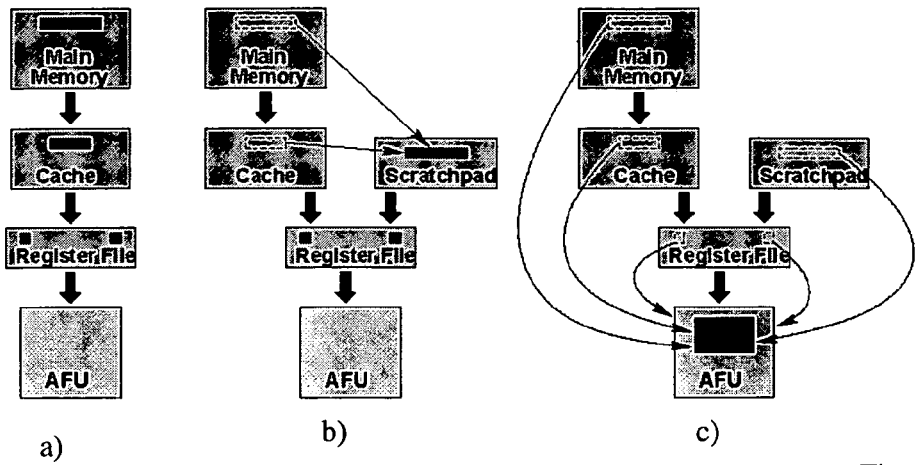

Fig. 1

```
for (k = 1; k ≤ n; k++)
  n1 = 1<<k;
  n2 = n1>>1;
  ...

for (j =0; j < n2; j++)
    ...

for (i= j; i < 2^n ; i += n1)
      l =i + n2;
      tRealData = (WReal * RealBitRevData[l]) + (WImag * ImagBitRevData[l]);
      tImagData = (WReal * ImagBitRevData[l]) -(WImag * RealBitRevData[l]);

tRealData = tRealData >> SCALE ͘ FACTOR;
      tImagData = tImagData >> SCALE FACTOR;
RealBitRevData[l] = RealBitRevData[i] -tRealData;
ImagBitRevData[l] = ImagBitRevData[i]-tImagData;
RealBitRevData[i] += tRealData;
ImagBitRevData[i] += tImagData;
```

Fig. 2

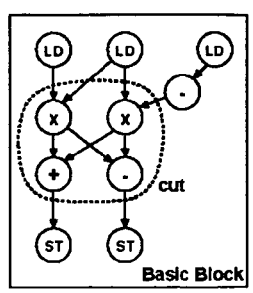
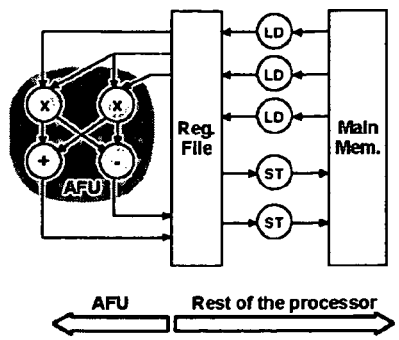
(a)          (b)
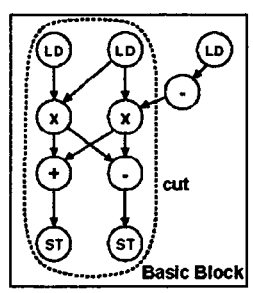
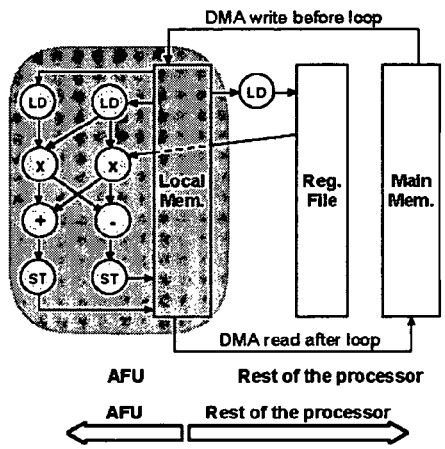
Fig 3
(c)          (d)
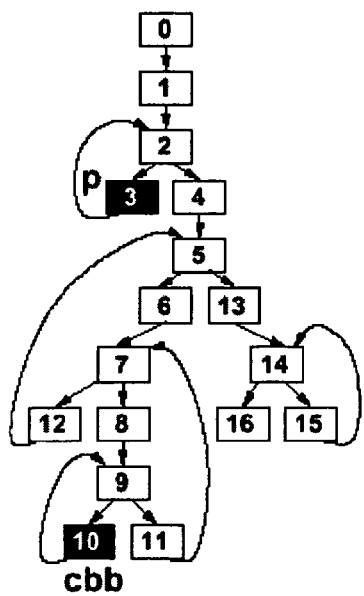
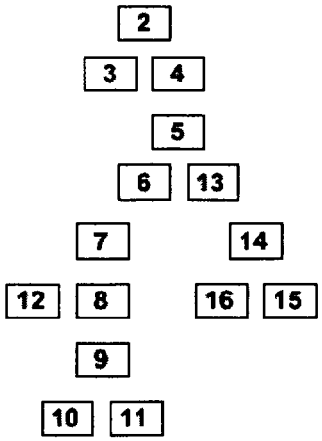
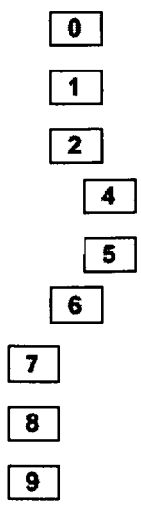
Fig 4
(a)          (b)          (c)

AUTOMATIC IDENTIFICATION OF APPLICATION-SPECIFIC FUNCTIONAL UNITS WITH ARCHITECTURALLY VISIBLE STORAGE

This U.S. non-provisional patent application claims priority under 35 U.S.C §119(e) of U.S. provisional patent application 60/757,906 filed on Jan. 11, 2006, the entire contents of which are hereby incorporated by reference.

1 INTRODUCTION

The design of embedded processors poses a great challenge due to a stringent demand for high performance, low energy consumption and low cost—a blend which is not often found in general purpose processors. On the other hand, since embedded processors are dedicated to a single application—or to a small set of them—unique possibilities arise for designers, who can exploit their knowledge of the application in order to achieve the aforementioned blend.

Generally, a cost-effective way to simultaneously speed up execution and reduce energy consumption is to delegate time-consuming tasks of the application to dedicated hardware, and leaving less critical parts to traditional software execution. This can be achieved by adding Application-specific Functional Units (AFUs) to the processor and Instruction Set Extensions (ISEs) to the instruction set for executing the critical portions of the application on the AFUs.

Since time-to-market is an important feature for the success of embedded processors and manual selection of ISEs can be a very time-demanding task, automatic identification of ISEs for a given application is of extreme importance. Indeed, a few automated techniques have been presented that sometimes match the performance of an expert designer. However, limitations still exist and in some cases the proposed techniques are still far from achieving the desired results. In particular, an important limitation is the inability of dealing with memory operations and allowing internal storage inside AFUs; in fact, apart from some simple exceptions treated in [4], the existing techniques are not able to include operations that access memory—while it is well known that memory traffic reduction is always of vital importance for performance as well as energy-efficiency.

In this paper, we present an innovative algorithm for automatic identification of ISEs with architecturally visible storage: we envision AFUs with small internal memory (FIG. 1) and propose a way to automatically detect and accelerate even those parts of the application that involve memory accesses. To show the effectiveness of our approach, we augment the SimpleScalar [19] processor with ISEs identified by our proposed algorithm on different applications. Our cycle-accurate results show that adding architecturally visible storage to an AFU results in an increase in average application speedup over pure software execution from 1.4× to 2.8×. Furthermore, the number of accesses to cache and main memory is also reduced by 66%, which also yields a significant energy reduction.

2 MOTIVATION

Many applications access small portions of memory multiple times in a frequently executed part of code. While previous techniques have attempted to move such memory accesses closer to the computational core (e.g., using scratchpad memories to reduce cache pollution), it is clear that we can gain significant benefit from moving such memory accesses directly into the computation core—i.e., directly into the AFUs (FIG. 1(c)). For example, consider a portion of the fft kernel from the EEMBC suite [20] shown in FIG. 2. The innermost loop is run $2^n/2^k$—i.e., $2^{n-k}$ times. Therefore, for each k, there are $2^{k-1} \cdot 2^{n-k}$ or $2^{n-1}$ accesses to memory. For n=8, k goes from 1 to 8 leading to $8 \cdot 127 = 1024$ memory accesses for each array variable in the critical region. Since there are 6 memory reads and 4 memory writes corresponding to array variables RealBitRevData[ ] and ImagBitRevData[ ], there are 6144 memory reads and 4096 memory writes in the fft kernel for n=8.

Existing automatic ISE techniques would identify instructions composed of dataflow and non-memory-access operations, such as the butterfly, leaving the memory accesses to the processor core. However, if the fft kernel executes in an AFU with a small local memory with a storage space for 256 elements, all 10240 accesses to main memory can be redirected to the fast and energy-efficient AFU-resident local memory.

In general, the advantages of an AFU-resident memory are manifold: it lowers cache pollution, it increases the scope of ISE algorithms, it increases the resulting performance, and it reduces energy consumption. This paper is the first to present a formal framework for automatically exploiting AFU-resident memories during ISE generation.

FIG. 1: (a) Data is copied from main memory, through cache and register file, before reaching the AFU. (b) A scratchpad helps reducing copies and pollution. (c) A local memory inside the AFU goes beyond previous achievements, by bypassing even the register file and reducing copies and pollution to the minimum.

3 RELATED WORK

Most related research efforts in automatic Instruction Set Extension, such as [1, 6, 7, 5, 2, 3], do not allow memory instructions to be selected in the acceleration section, and thus do not consider either memory ports in AFUs or AFU-resident memory. Thus, they miss the speedup opportunities enabled for the first time in this work. One recent work indeed considered memory inside AFUs [4], but only in very special cases—namely in the cases of read-only memory and loop-carried scalars. This paper, on the other hand, presents a general formulation that considers any kind of vector or scalar access without restriction. Our solution, in fact, encompasses the special cases treated in [4].

PICO-NPA [14] bears a similarity with our work as its architectural model permits the storage of reused memory values in accelerators. But, it does not present a method for identifying the portions of application code to be mapped on the accelerator; that is left to a manual choice, while we present an automated approach in this paper. Another work in reconfigurable computing [8] considered automatically selected coprocessors with direct memory access. On the other hand, our technique identifies whole arrays or scalars to be loaded into an AFU, and furthermore permits the processor to access the AFU memory directly (rather than the main memory) during inner loop execution. This is an innovative proposal, which was not considered in prior work; our experimental results prove its effectiveness.

Register Promotion [15] is a compiler technique that aims at reducing memory traffic by promoting memory accesses to register accesses. However, previous efforts have not used it in the context of ISEs, where memory accesses can instead be eliminated by AFU residency—i.e., both dataflow computation and memory accesses are identified together and delegated to special computation units, bypassing even the register file. Finally, the contributions presented in this paper bear some resemblance with a recent work on scratchpads [12], and with one using application-specific memories instead of caches [13]. We go beyond such approaches by bringing portions of storage closer to the core—directly inside the AFU that is going to use them (as shown in FIG. 1(c)).

BRIEF DESCRIPTION OF THE FIGURES

This invention will be better understood thanks to the attached figures, given as non limiting examples, in which:

FIG. 1 shows: (a) Data is copied from main memory, through cache and register file, before reaching the AFU. (b) A scratchpad helps reducing copies and pollution. (c) A local memory inside the AFU goes beyond previous achievements, by bypassing even the register file and reducing copies and pollution to the minimum.

FIG. 2 shows a software solution for the fft kernel,

FIG. 3 shows a former solution a and b and the new solution c and d. In (a) a cut could not include any memory access nodes (LD/ST) and (b) the corresponding AFU did not hold state; the AFU fetched all operands from the register file. Now, (c) a cut can include memory-access operations to a vector and (d) the corresponding AFU has a copy of the vector in its internal memory; all memory operations in this basic block access the AFU internal memory instead of main memory.

FIG. 4 shows an fft example in comprising a Control Flow Graph, a set of nodes that can be reached by polluter node and the set of nodes that strictly dominate node 10.

4 MEMORY—AWARE ISE IDENTIFICATION

Figure 5:
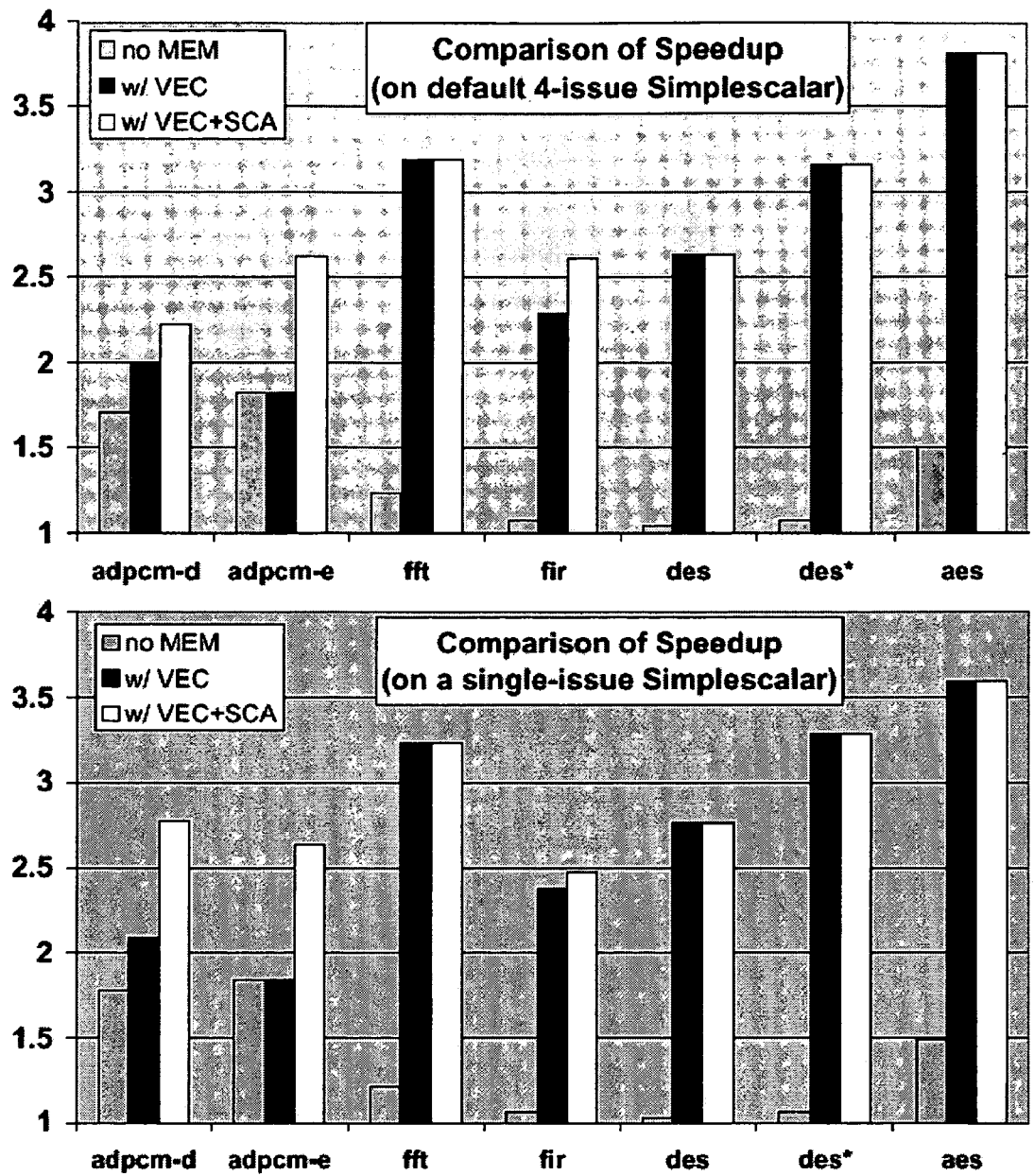
FIG. 5 shows a comparison of speedup for I/O constraints of 4/2 obtained on a four-issue (default) and single-issue SimpleScalar with ARM instruction set.

We first introduce a general formulation of the ISE identification problem [2] and then we list the differences required to identify memory holding ISEs. We call G (V, E) the DAGs representing the dataflow of a critical basic block; nodes V represent primitive operations and edges E represent data dependencies. A cut C is a subgraph of G: $C \subseteq G$. A function M(C) measures the merit of a cut C, and represents an estimation of the speedup achievable by implementing C as a special instruction.

We call IN (C) and OUT (C) the number of inputs and outputs respectively of cut C, while values $N_{in}$ and $N_{out}$ indicate the number of register-file read and write ports, respectively, which can be used by the special instruction. Also due to microarchitectural constraints, operations of a certain type might not be allowed in a special instruction. We call F (with $F \subset V$) the set of forbidden nodes that should never be part of $\overline{C}$.

The identification problem is formally stated as follows: Problem 1 Given a graph G and the microarchitectural features $N_{in}$, $N_{out}$, and F, find the cut C which maximizes M(C) under the following constraints:
1 IN (C)≦$N_{in}$,
2 OUT (C)≦$N_{out}$,
3 F∩C=0, and
4 C is convex.

The first two constraints guarantee I/O feasibility, the third one disallows inclusion of forbidden nodes, while the last constraint ensures that all inputs are present at the time of issue. When considering state-holding ISEs, (rather than purely combinational ones as in [2]), two features must be adapted: the content of F and the definition of M(C). Ideally, all memory access nodes can now be excluded from the set F, i.e., they can be included in a cut (in practice, we apply a compiler pass to exclude from F all accesses to vectors and loop-carried scalars; pointer accesses are still not treated at present). The merit function M(C) must take into account the cost of transferring data between the AFU-memory and the main memory.

4.1 Architectural Organization

If all memory accesses are forbidden in C, as in previous work, the envisioned situation is that of FIG. 3(a): a cut can only contain dataflow operations. FIG. 3(b) describes the architectural side: the load/store unit of the processor effects the transfers between register file and main memory, and the AFU fetches its operands from the register file—like any functional unit. However, when memory accesses to some vector are allowed in a cut, as shown in FIG. 3(c), a state-holding AFU is taken into consideration. A state-holding AFU can also include scalar accesses; these can be treated as a special case of vectors. FIG. 3(d) shows the AFU corresponding to the cut chosen: a copy of the vector is resident in the internal memory and all memory accesses to that vector in the basic block—whether included in the cut or not—access the local AFU memory rather than the main memory. Architecturally, in the most general case, the vector in question needs to be transferred from the main memory to the AFU local memory by Direct Memory Access (DMA) before loop execution (i.e., before executing the critical basic block). As a result, all memory accesses to the vector are now transformed into internal accesses to the local memory instead. At the end of the loop (i.e., after executing the critical basic block) the vector is copied back to main memory—only if needed. Note the much decreased register file pressure (only one register read) and reduced main memory access (only two accesses) in the example of FIG. 3(d).

4.2 Merit Function and Problem Solution

In the following, critical basic block (cbb) refers to the basic block for which an ISE is currently being identified.

The merit function M(C) per unit execution of cbb is expressed as follows:

$$M(C)=\lambda_{sw}(C)-\lambda_{sw}(C)-\lambda_{overhead}(C), \quad (1)$$

where $\lambda_{sw}$ (C) and $\lambda_{sw}$ (C) are the estimated software latency (when executed natively in software) and hardware latency (when executed on an AFU) of the cut C respectively, and $\lambda_{overhead}$ estimates the transfer cost. Consider a DMA latency of $\lambda_{DMA}$, and suppose that the DMA write and read operations required will be placed in basic blocks wbb and rbb, whose execution counts are $N_{Wbb}$ and $N_{rbb}$ respectively (ideally much smaller than the execution count of cbb, $N_{cbb}$, where the ISE is identified).

The transfer cost can be expressed as:

$$\lambda_{overhead} = \frac{N_{wbb} + N_{rbb}}{N_{cbb}} \cdot \lambda_{DMA}$$

Note that all the considerations above are valid not only for vectors but also for inclusion of scalar accesses. However, in the case of scalar accesses, the transfer will be much cheaper as it does not involve DMA setup and transfer overhead. In the rest of the paper we will use the term "memory transfer" for both vectors and scalars.

For a given cbb, the steps for generating ISEs that include architecturally-visible storage are: (i) Find vectors and scalars accessed in cbb; for this we can use some well-known static memory disambiguation techniques [16]. (ii) Search for the most profitable code positions for inserting memory transfers between the AFU and the main memory—this is a fundamental problem and the solution is discussed in the next section. (iii) Run ISE identification. We use the ISE identification algorithm presented in [2], which is an improvement over [1] and can optimally solve Problem 1 for basic blocks of approximately 1000 nodes. In the algorithm, we use the updated merit function M(C) expressed in Equation (1) to evaluate the merit of a selected cut. The pruning criterion in [2] had to be relaxed in order to handle memory-awareness correctly.

4.3 Scheduling Data Transfers

To ensure profitability of memory inclusion in an AFU, memory transfer operations between main memory and the AFU must be performed in basic blocks with the least possible execution count. However, they must be performed in basic blocks that ensure semantic correctness of the program. Now, we will discuss where to insert a DMA write operation (transfers from main memory to AFU); insertion of DMA read requires a very similar and dual procedure.

Intuitively, for correctness, a DMA write should be inserted in a basic block wbb (1) situated after any basic block that modifies the vector to be included in the AFU, and (2) which always reaches cbb in the control flow. Therefore, after identifying accessed vectors and scalars v in cbb, for every v, we execute the following steps to determine the basic block wbb—a node in the CFG—where a DMA write should be placed:

1 Determine the set P (polluters) of nodes where v is written, excluding cbb.
2 For each node p∈P, determine the set of nodes reachable by it including p, indicated as Rp. Such a set can be obtained in linear time by traversing the CFG.
3. Determine the set $D_{cbb}$ of basic blocks which strictly dominate cbb. A node $n_1$ strictly dominates a node $n_2$ if every path from the procedure entry node to $n_2$ passes through $n_1$ and n1≠n2. This set can be computed in polynomial time by traversing the CFG [17].
3  Compute the intersection of all sets: $S_{wbb}=D_{cbb} \cap R_{p1} \cap R_{p2} \cap \ldots$, with $p_1, p_2, \ldots \in P$. This represents the set of nodes where it is correct to place a DMA write operation.
4 Choose the node in $S_{wbb}$ with the least execution count—this is wbb. If $S_{wbb}=\phi$, the DMA write is not required.

FIG. 4 illustrates the algorithm as applied to the fft example. FIG. 4(a) depicts the CFG of the application, where the entry node is 0, cbb was identified as node 10, and the set of polluter nodes P consists of node 3 only. FIG. 4(b) shows the set $R_3$, containing nodes 2 to 16. FIG. 4(c) depicts the set $D_{cbb}$, which consists of nodes {0, 1, 2, 4, 5, 6, 7, 8, 9}. It represents the set of nodes where it is correct to insert a DMA write operation. The node where it is correct and most beneficial to insert the DMA write is the one with the least execution count, which in this case is node 4 (execution counts, not shown here, are gathered with profiling). Therefore, node 4 is finally chosen as wbb and a DMA write is placed there.

5 EXPERIMENTS

We implemented our memory-aware ISE generation algorithm on the MACHSUIF [18] framework. We used six benchmarks to demonstrate the effectiveness of our approach: adpcm-d (ADPCM Decoder), adpcm-e (ADPCM Encoder),fft (Fast Fourier Transform), fir (FIR filter), des (Data Encryption Standard), and aes (Advanced Encryption Standard), taken from Mediabench, EEMBC, and cryptography standards. We chose the cycle-accurate SimpleScalar simulator [19] for the ARM instruction set and modified it as follows. For vectors, we introduced a DMA connection between the local memory inside an AFU and the main memory by adding four new instructions to the instruction set: two for setting the source and destination addresses and two for setting the command registers to transfer data from main memory to AFU memory and vice versa. For handling scalars, two additional instructions were added to set and get local registers inside the AFU. Of course, we also added the application-specific ISEs identified by our ISE generation algorithm.

The hardware latency for each instruction was obtained by synthesizing the constituent arithmetic and logic operators on the UMC 0.18 μm CMOS process using the Synopsys Design Compiler. The access latency of the internal memory (modeled as an SRAM) was estimated using the Artisan UMC 0.18 μm CMOS process SRAM Generator. The default SimpleScalar architecture is equipped with 4 integer ALUs, 1 integer multiplier/divider, 4 floating-point adders, 1 floating-point multiplier/divider, and a three-level memory hierarchy for both instruction and data. The sizes of L1 and L2 data caches are 2 KB and 32 KB respectively. The main memory has a latency of 18 cycles for the first byte and 2 cycles for subsequent bytes. The same latency is also used when transferring data between main memory and AFU by DMA.

Our baseline case is pure software execution of all instructions. We set the I/O constraints to 4 inputs and 2 outputs and generated a single cut to be added as an ISE to the SimpleScalar architecture. First, we generated the cut without allowing memory inclusion ("no MEM"). Then, we allowed local memory inside with vector accesses ("w/VEC") and subsequently with scalars accesses also ("w/VEC+SCA"). For these three cases, we show in FIG. 5 a comparison of speedup on several applications obtained on the default SimpleScalar architecture (4-width out-of-order issue) as well as on the single-issue SimpleScalar architecture.

Observe that (1) the speedup is raised tangibly when state holding AFUs are considered (1.4× on average for the case with no memory, to 2.8× for the "w/VEC+SCA" case, on the default architecture, and (2) the trend of speedups obtained on the two different configurations of the SimpleScalar architecture is the same. The label des* indicates the results for des with 3 ISEs rather than with a single one (des is the only benchmark where a single cut was not enough to cover the whole kernel).

Figure 6:
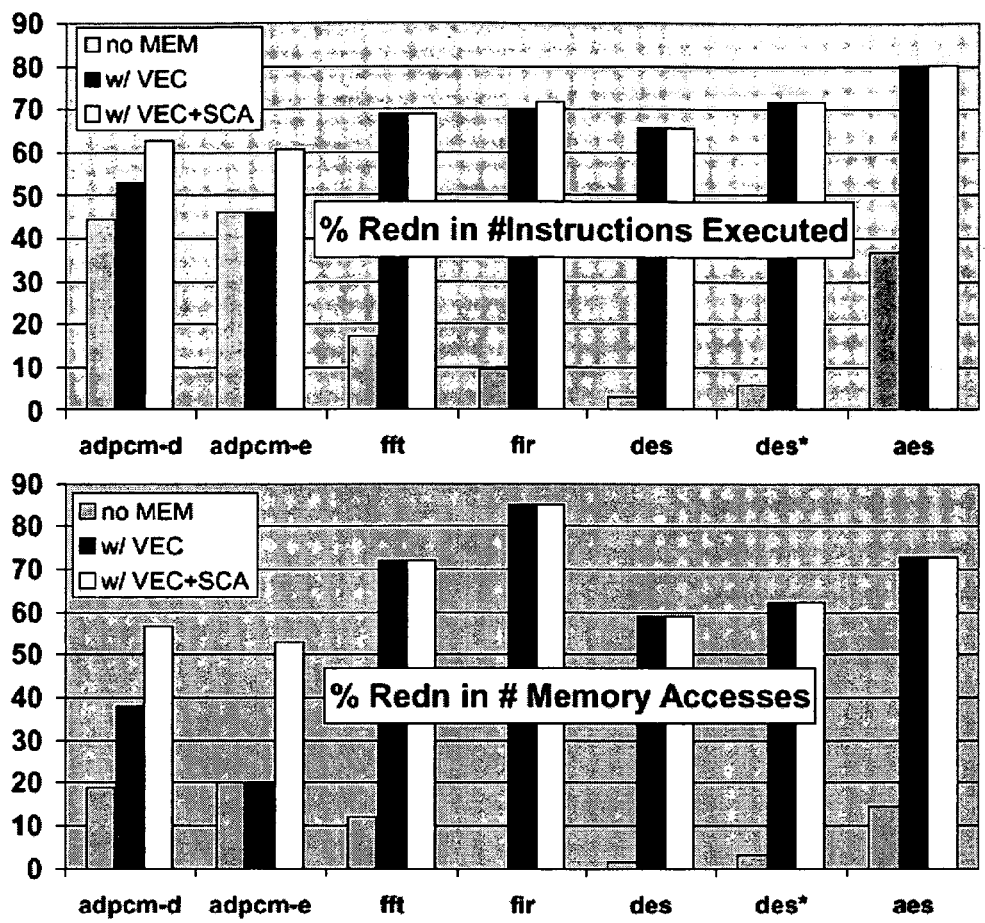
FIG. 6 shows a percentage reduction in the number of instructions executed and the number of memory accesses.

FIG. 6 shows the reduction in the number of instructions executed and in the number of memory accesses. Interestingly, there is an average 9% reduction in memory operations even before incorporating memory inside the AFU. This is because the ISEs generally reduce register need (multiple instructions are collapsed into one) and therefore reduce spilling.

Figure 7:
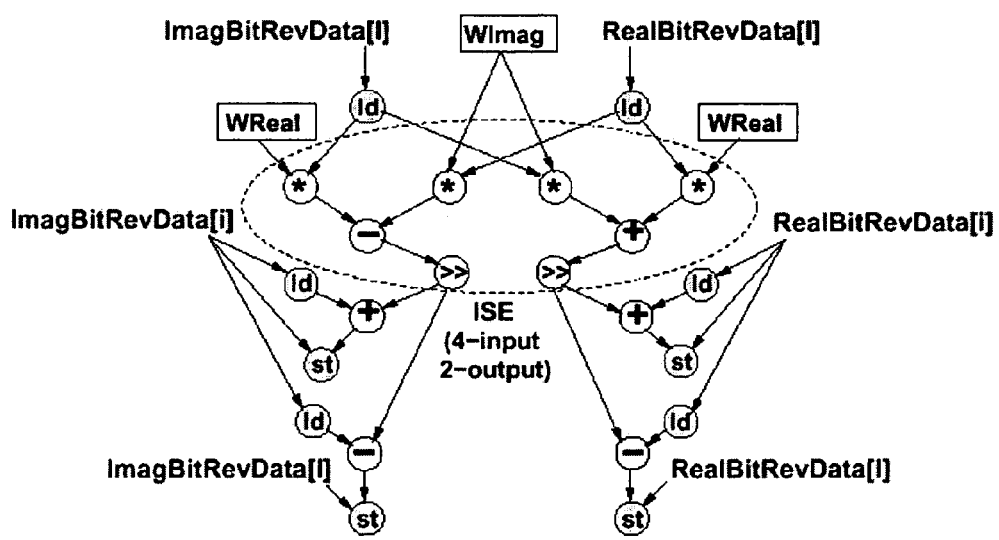
FIG. 7 shows a Data Flow Graph of fft. The whole kernel is chosen when architecturally visible storage is allowed; only the cut in a dotted line is chosen otherwise.

With the incorporation of memory inside the AFU, the average reduction in memory instructions is a remarkable two thirds, hinting a very tangible energy reduction. Table 1 shows that the sizes of the vectors incorporated in the AFU for the given benchmarks are fairly limited. Note that by handling vectors and scalars in a unified manner, our results clearly subsume the merits of including read-only memory and state registers as presented in [4]. The benchmarks adpcm-d, adpcm-e, and fir very clearly show the advantage of including scalars by exhibiting a marked increase in speedup due to the increased scope of ISE. FIG. 7 shows the kernel of fft, with the omission of address arithmetic. With local storage inside the AFU, a single cut covers the entire DFG, thus almost doubling the speedup obtained without memory in the AFU.

6 CONCLUSIONS

Embedded processors can be accelerated by augmenting their core with application-specific Instruction Set Extensions. Traditionally, memory access operations were either not included in ISEs or were limited to special classes of memory operations; thus ISEs were so far limited by the "memory wall" problem. Our paper is the first comprehensive effort to overcome the memory wall problem for ISEs. Specifically, our main contributions are as follows: (1) We show an architectural modification to include architecturally visible storage inside ISEs, clearly encompassing the special cases addressed by previous work. (2) We introduce an algorithm to profitably identify code positions for inserting data transfers between the main memory and the local storage in ISEs. We demonstrate the effectiveness of our approach by incorporating the generated ISEs in the cycle-accurate SimpleScalar simulator. Our results show that the average speedup on a number of benchmarks increases from 1.4× to 2.8× by including architecturally-visible storage in ISEs. Furthermore, an accompanied reduction of costly memory accesses by two thirds clearly highlights a concomitant reduction in energy.

In this work, we only considered array variables as vectors and manually verified that there is no malicious access to those vectors through pointers. In future, we plan to extend our approach to include pointer variables also, using existing pointer disambiguation techniques. Another possible future direction is to exploit the data reuse within the critical section of an application and pipeline the ISE execution in successive iterations, while bringing inside only the required portion of memory.

TABLE 1

Summary of local memories selected for the different benchmarks.

| Benchmarks | Array Identifier | Size (bytes) |
|---|---|---|
| adpcm-d | stepsizeTable | 356 |
|  | indexTable | 64 |
| adpcm-e | stepsizeTable | 356 |
|  | indexTable | 64 |
| fft | RealBitRevData | 512 |
|  | ImagBitRevData | 512 |
| fir | inbuf16 | 528 |
|  | coeff16 | 128 |
| des | des_SPtrans | 2048 |
| aes | Sbox | 256 |

The contents of the following publications are hereby incorporated by reference in their entirety, [1] K. Atasu, L. Pozzi and P. Ienne. Automatic Application-Specific Instruction-Set Extensions under Microarchitectural Constraints. In Proc. of DAC, 2003, [2] L. Pozzi, K. Atasu, and P. Ienne. Optimal and Approximate Algorithms for the Extension of Embedded Processor Instruction Sets. To appear in IEEE TCAD, [3] J. Cong, Y. Fan, G. Han, and Z. Zhang. Application-specific instruction generation for configurable processor architectures. In Proc. of FPGA, 2004, [4] P. Biswas, V. Choudhary, K. Atasu, L. Pozzi, P. Ienne and N. Dutt. Introduction of Local Memory Elements in Instruction Set Extensions. In Proc. of DAC, 2004, [5] P. Biswas, S. Banerjee, N. Dutt, L. Pozzi and P. Ienne. ISEGEN: Generation of High-Quality Instruction Set Extensions by Iterative Improvement. In Proc. of DATE, 2005, [6] N. Clark, H. Zhong and S. Mahlke. Processor Acceleration through Automated Instruction Set Customization. In Proc. of MICRO, 2003, [7] F. Sun, S. Ravi, A. Raghunathan and N. K. Jha. Synthesis of Custom Processors based on, Extensible Platforms. In Proc. of ICCAD, 2002, [8] T. Callahan and J. Wawrzynek. Adapting Software Pipelining for Reconfigurable Computing. In Proc. of CASES, 2000, [9] A. Wang, E. Killian, D. Maydan and C. Rowen. Hardware/Software Instruction Set Configurability for System-onchip Processors. In Proc. of DAC, 2001, [10] R. Razdan and M. D. Smith. A High-performance Microarchitecture with Hardware-programmable Functional Units. In Proc. of MICRO, 1994, [11] Z. A. Ye, A. Moshovos, S. Hauck and P. Banerjee. CHIMAERA: A High-performance Architecture with a Tightly coupled Reconfigurable Functional Unit. In Proc. of ISCA, 2000, [12] S. Steinke, L. Wehmeyer, B. S. Lee and P. Marwedel. Assigning Program and Data Objects to Scratchpad for Energy Reduction. In Proc. of DATE, 2002, [13] L. Benini, A. Macii, E. Macii, M. Poncino. Synthesis of Application-Specific Memory for Power Optimization in Embedded Systems. In Proc. of DAC, 2000, [14] R. Schreiber, S. Aditya, S. Mahlke, V. Kathail et al. PICO-NPA: High-Level Synthesis of Nonprogrammable Hardware Accelerators. Journal of VLSI Signal Processing Systems archive, Volume 31, Issue 2, pages 127-142, 2002, [15] K. D. Cooper and J. Lu. Register Promotion in C Programs. In Proc. of PLDI, 1997, [16] D. M. Gallagher. Memory Disambiguation to Facilitate Instruction-Level Parallelism Compilation. PhD Thesis, University of Illinois, Urbana-Champaign, 1995, [17] S. S. Muchnick. Advanced Compiler Design and Implementation. Morgan Kaufmann Publishers, 1997, [18] Machine SUIF., [19] The SimpleScalar Tool Set, Version 2.0. Computer Architecture News, pp. 13-25, 1997, and [20] The EEMBC T eleBench™,. Version 1.1.

The invention claimed is:

1. Method for identifying and programming, from a source code, an Application-specific Functional Unit (AFU) using at least one input data element and producing at least one output data element, comprising:
   creating a control flow graph containing a set of basic block representing the said source code,
   defining a critical basic block (CBB) comprising at least one basic block,
   identifying data elements referenced by the critical basic code block (CBB),
   identifying and programming the Application-specific Functional Unit (AFU) with storage capabilities for said identified data elements containing the critical basic code (CBC) function,
   identifying source code positions which modify said input data elements,
   identifying source code positions which reference said output data elements,
   inserting a call to the Application-specific Functional Unit (AFU),
   inserting an input transfer function to move the input data elements into the Application-specific Functional Unit (AFU) storage means in between the last code position modifying input data elements and the call to the Application-specific Functional Unit (AFU),
   inserting an output transfer function to move the output data elements from the Application-specific Functional Unit (AFU) storage means in between the return from the call to the Application-specific Functional Unit (AFU) and the first code position referencing the output data elements, defining a subset of basic blocks between the last code position modifying input data elements and the call to the Application-specific Functional Unit (AFU), defining for each basic block the number of times said basic block is executed in said source code, and inserting said input transfer function in a basic block with the lowest execution count.

2. A method according to the claim 1, wherein the Application-specific Functional Unit (AFU) comprises additional storage capabilities in order to fulfill the functionality required.

3. A method according to the claim 1, wherein the input and output data elements represent the same source code storage elements.

4. A method according to the claim 1, wherein the input and output data elements represent different source code storage elements.

5. A method according to the claim 1, wherein the input and output data elements represent the same source code storage structures or types.

6. A method according to the claim 1, wherein the input and output data elements represent different source code storage structures or types.

7. A method according to the claim 1, wherein said input transfer function transfer a subset of said input data elements according to their state.

8. A method according to the claim 1, wherein said output transfer function transfer a subset of said output data elements according to their state.

9. Method for identifying and programming, from a source code, an Application-specific Functional Unit (AFU) using at least one input data element and producing at least one output data element, comprising:

creating a control flow graph containing a set of basic block representing the said source code, defining a critical basic block (CBB) comprising at least one basic block, identifying data elements referenced by the critical basic code block (CBB), identifying and programming the Application-specific Functional Unit (AFU) with storage capabilities for said identified data elements containing the critical basic code (CBC) function, identifying source code positions which modify said input data elements, identifying source code positions which reference said output data elements, inserting a call to the Application-specific Functional Unit (AFU), inserting an input transfer function to move the input data elements into the Application-specific Functional Unit (AFU) storage means in between the last code position modifying input data elements and the call to the Application-specific Functional Unit (AFU), inserting an output transfer function to move the output data elements from the Application-specific Functional Unit (AFU) storage means in between the return from the call to the Application-specific Functional Unit (AFU) and the first code position referencing the output data elements, defining a subset of basic blocks between the first code position referencing said output data elements and the return from the call to the Application-specific Functional Unit (AFU), defining for each basic block the number of times said basic block is executed in said source code, and inserting said output transfer function in a basic block with the lowest execution count.

10. A method according to the claim 9, wherein the Application-specific Functional Unit (AFU) comprises additional storage capabilities in order to fulfill the functionality required.

11. A method according to the claim 9, wherein the input and output data elements represent the same source code storage elements.

12. A method according to the claim 9, wherein the input and output data elements represent different source code storage elements.

13. A method according to the claim 9, wherein the input and output data elements represent the same source code storage structures or types.

14. A method according to the claim 9, wherein the input and output data elements represent different source code storage structures or types.

15. A method according to the claim 9, wherein said input transfer function transfer a subset of said input data elements according to their state.

16. A method according to the claim 9, wherein said output transfer function transfer a subset of said output data elements according to their state.

* * * * *